(12) United States Patent
Pastor et al.

(10) Patent No.: US 9,063,537 B2
(45) Date of Patent: Jun. 23, 2015

(54) DEVICE FOR INTERACTION WITH AN AUGMENTED OBJECT

(75) Inventors: Alain Pastor, Nozay (FR); Jose Jean, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 93 days.

(21) Appl. No.: 13/499,691

(22) PCT Filed: Sep. 3, 2010

(86) PCT No.: PCT/FR2010/051837
§ 371 (c)(1),
(2), (4) Date: Jun. 8, 2012

(87) PCT Pub. No.: WO2011/042632
PCT Pub. Date: Apr. 14, 2011

(65) Prior Publication Data
US 2012/0243743 A1 Sep. 27, 2012

(30) Foreign Application Priority Data
Oct. 5, 2009 (FR) ...................................... 09 56914

(51) Int. Cl.
*G06K 9/00* (2006.01)
*G05B 19/409* (2006.01)
(Continued)

(52) U.S. Cl.
CPC .... *G05B 19/409* (2013.01); *G05B 2219/32014* (2013.01); *G05B 2219/40195* (2013.01); *H04N 7/002* (2013.01); *H04N 21/4131* (2013.01); *H04N 21/4223* (2013.01); *H04N 21/43615* (2013.01); *H04N 21/44008* (2013.01); *H04N 21/47205* (2013.01); *H04N 21/4788* (2013.01)

(58) Field of Classification Search
CPC combination set(s) only.
See application file for complete search history.

(56) References Cited

U.S. PATENT DOCUMENTS 4,982,438 A * 1/1991 Usami et al. ................... 382/154
6,867,699 B2 * 3/2005 Curwen et al. ............. 340/573.4
(Continued)

FOREIGN PATENT DOCUMENTS

| JP | 2002-44646 | 2/2002 |
|---|---|---|
| JP | 2005-63225 | 3/2005 |

(Continued)

OTHER PUBLICATIONS

International Search Report for PCT/FR2010/051837 dated Dec. 9, 2010.

*Primary Examiner* — Jon Chang
*Assistant Examiner* — Oneal R Mistry
(74) *Attorney, Agent, or Firm* — Fay Sharpe LLP

(57) ABSTRACT

A device for interacting with at least one augmented object, where the augmented object comprises a physical object and an associated virtual object, said virtual object comprising at least one service definition element, where it is possible to connect to the augmented object via a first means of communication, said device comprising: A means of video capture, A user terminal, An automatic means of identifying the augmented object, A means of communication, capable of establishing a connection between the device and the identified augmented object, and to recover said service definition elements, A means of defining a control interface for the services of the identified augmented object according to said service definition elements, A reader, capable of reading the commands, in relation to said control interface, A means of communication, to transmit said commands to the augmented object for execution.

14 Claims, 2 Drawing Sheets

(51) Int. Cl.
  *H04N 21/41* (2011.01)
  *H04N 21/4223* (2011.01)
  *H04N 21/436* (2011.01)
  *H04N 21/44* (2011.01)
  *H04N 21/472* (2011.01)
  *H04N 21/4788* (2011.01)
  *H04N 7/00* (2011.01)

(56) References Cited

U.S. PATENT DOCUMENTS

| | | | |
|---|---|---|---|
| 6,998,987 B2 * | 2/2006 | Lin | 340/573.1 |
| 7,447,507 B1 * | 11/2008 | Infosino | 455/456.1 |
| 2004/0131254 A1 * | 7/2004 | Liang et al. | 382/181 |
| 2005/0097478 A1 * | 5/2005 | Killian et al. | 715/851 |
| 2007/0112939 A1 * | 5/2007 | Wilson et al. | 709/219 |
| 2008/0144884 A1 * | 6/2008 | Habibi | 382/103 |
| 2010/0086050 A1 * | 4/2010 | Badawy | 375/240.16 |
| 2011/0051999 A1 * | 3/2011 | Tu et al. | 382/103 |
| 2011/0130887 A1 * | 6/2011 | Ehlers, Sr. | 700/296 |
| 2012/0262628 A1 * | 10/2012 | Wilson et al. | 348/552 |
| 2013/0108112 A1 * | 5/2013 | Aratani et al. | 382/103 |

FOREIGN PATENT DOCUMENTS

| | | |
|---|---|---|
| JP | 2009-520316 | 5/2009 |
| WO | WO 2006/009521 A1 | 1/2006 |
| WO | 2007/072285 | 6/2007 |
| WO | WO 2007072285 A1 * | 6/2007 |
| WO | WO 2009/113067 A2 | 9/2009 |

\* cited by examiner

DEVICE FOR INTERACTION WITH AN AUGMENTED OBJECT

The present invention concerns a new interaction paradigm, enabling a user to interact with at least one object in an environment, through the intermediary of a video link.

Many environments and applications require the interaction of a user with objects seen through a video link, for example in the case of remote objects, or dangerous environments.

It is common, for example from U.S. Pat. No. 6,463,343, to display, via a video link, an environment comprising at least one "active" object, and to superimpose command interface elements associated with services offered by said object, in order to enable a user to interact with said object, the video link making it possible to visually monitor the consequences of an interaction.

However, in U.S. Pat. No. 6,463,343, the user must, in advance of any action, define associations between, on the one hand, the command interface elements typically coming from a storage medium, and on the other hand, the services offered by an object.

Since the arrival of the Internet of Things, the discovery and control of remote objects through a video image has become a major area of interest. The main problem is to discover and act on an interactive object via a video link, while limiting the interface integration and configuration work.

This implies an ability to automatically distinguish objects that have a remote control interface from other ordinary objects, as well as an ability to present this control interface to the user together with said video, in order to enable the user to control the remote object by using the services offered by said object.

Currently, it is only common to insert static information into a video, or to insert comments into a specific area of an image.

This invention remedies these disadvantages by proposing the means to automatically associate an active object with control interfaces or means of defining such interfaces. This is made possible through the innovative concept of the augmented object. Such a concept naturally finds its place in current developments concerning the Internet of Things.

The purpose of the invention is a device enabling a user, located in a user area, to interact with at least one augmented object present in an environment, said augmented object being located in an object area, the augmented object comprising a physical object and an associated virtual object, said virtual object comprising at least one definition element for at least one service offered by said augmented object, said augmented object being able to be connected via a first means of communication, and said device comprising:

- A means of capturing video, located in the object area, capable of taking a video image, of at least one part of said environment,
- A second means of communication, capable of transmitting said video image of the object area to the user area,
- A user terminal located in the user area, capable of displaying said video image, in order to present to the user,
- A means of automatically identifying the augmented object when the associated physical object is present in the field of the means of video capture,
- A first means of communication, capable of establishing a connection between the device and the identified augmented object, and to recover said definition elements for the services offered by said augmented object,
- A means of defining the control interface, capable of defining a control interface for the services of the identified augmented object according to said service definition elements, and to present said control interface to the user, through the user terminal,
- A reader commands for said services, capable of reading the commands coming from the user, in relation to said control interface,
- A third means of communication, capable of transmitting said commands to the augmented object, so that the physical object can execute said services.

According to another characteristic of the invention, the device also comprises a means of sound capture, located in the object area, capable of capturing sound from the environment, a fourth means of communication capable of transmitting said sound from the object area to the user area, the user terminal comprising a means of sound play-hack, capable of playing said sound for the user.

According to another characteristic of the invention, the attitude and/or position of the means of video capture can be controlled, the user terminal also comprises a means of command, capable of enabling the user to carry out said control by producing control commands, and the device also comprises a fifth means of communication, capable of transmitting said control commands from the user area to the object area.

According to another characteristic of the invention, the means of automatically identifying the augmented object comprises a means of recognizing the shape of the physical object.

According to another characteristic of the invention, the means of automatically identifying the augmented object comprises a means of locating the physical object.

According to another characteristic of the invention, the means of automatically identifying the augmented object comprises an identifying marker positioned on or near the physical object.

According to another characteristic of the invention, the interface definition means is capable of using a control interface proposed directly by the augmented object.

According to an alternative characteristic of the invention, the interface definition means is capable of recovering a control interface defined according to the service definition elements from a means of storage.

According to another characteristic of the invention, the interface definition means is capable of displaying said control interface, embedded into the video image displayed on the user terminal.

According to another characteristic of the invention, the means of reading the commands for said services, in relation with said control interface, comprises a keyboard, a touch pad, and/or a pointing mechanism.

According to another characteristic of the invention, the third means of communicating the commands for said services to the augmented object comprises a link between the user terminal and the augmented object and a special connection interface between the virtual object and the physical object.

According to another advantageous characteristic of the invention, the first, second, third, fourth, and fifth means of communication also comprise the Internet network.

Other characteristics, details, and advantages of the invention will become more clearly apparent from the detailed description given below by way of example with reference to the drawings, in which.

Figure 1:
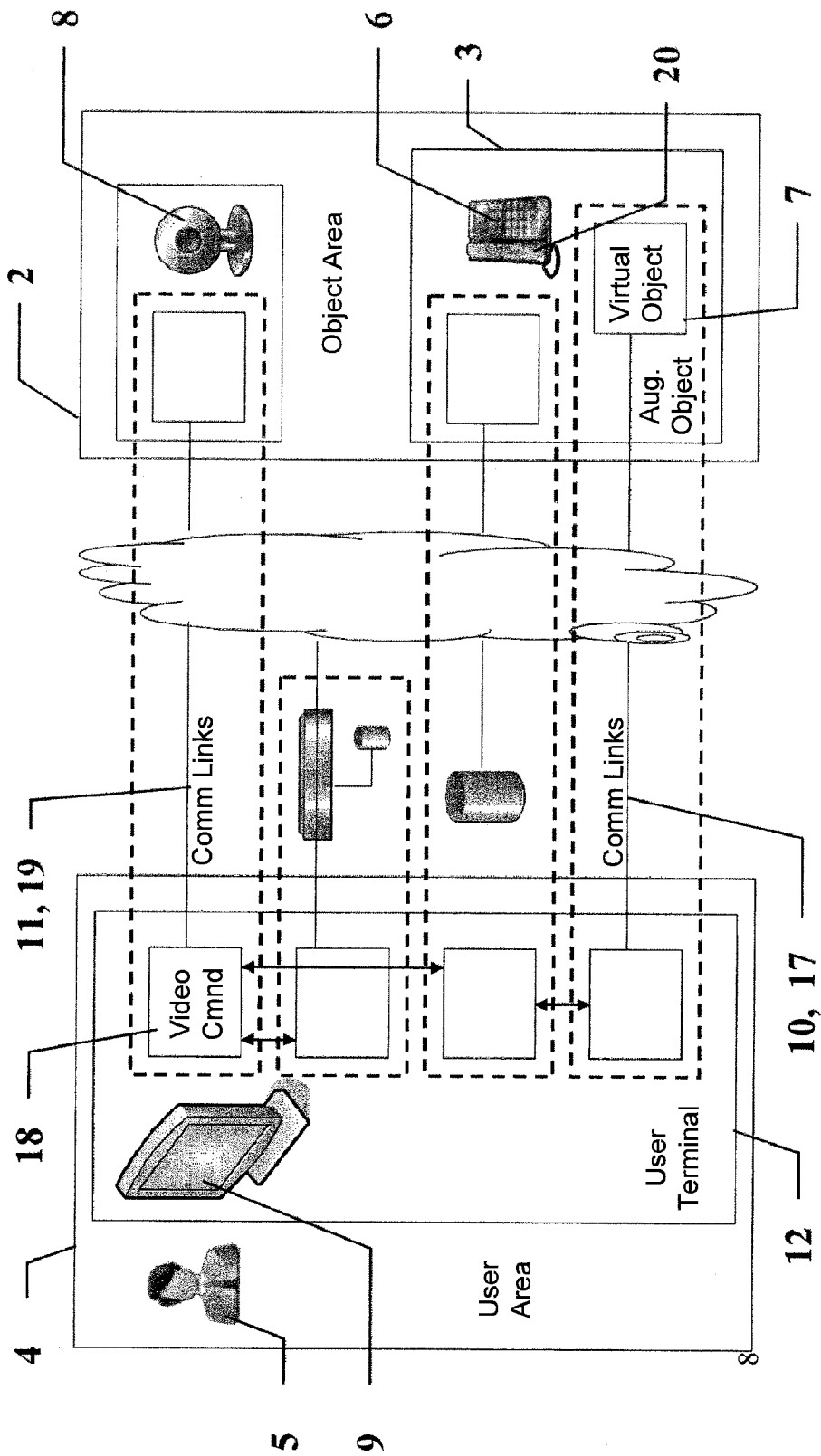
FIG. 1 is a synoptic diagram of a device according to the invention.
Figure 3:
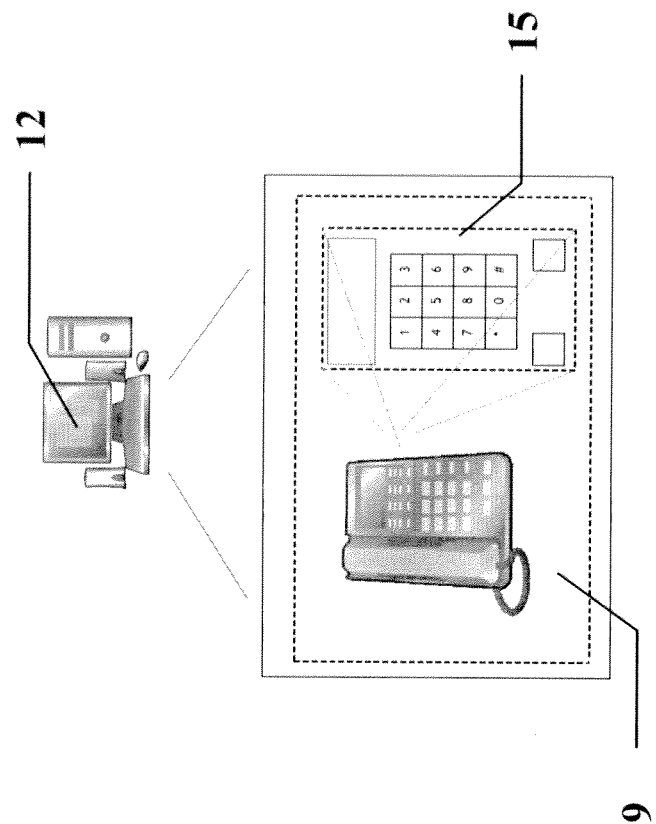
FIG. 3 shows an example of the superimposed display of a video image and a control interface for the augmented object presented in FIG. 2.
Figure 2:
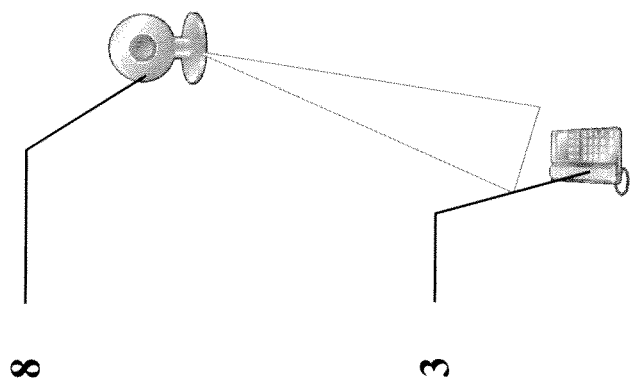
FIG. 2 depicts an example of an object area comprising an augmented object.

FIG. 1 depicts a device 1 according to the invention. In a so-called object area 2, there is an environment comprising at least one augmented object 3. Said device 1 enables a user 5 located in a user area 4, typically distinct and remote from the object area 2, to detect the augmented object or objects 3 and to interact with them. To do so, according to an essential characteristic of the invention, an augmented object is constructed around a physical object 6, to which a virtual object is added 7. Said physical object 6 is a real world object 6, preferably an active object, in the sense that it can offer at least one service.

As illustrative and non-limiting examples, some objects 3 can be cited to explain the point. Thus a lamp is an object that can offer two services: a "turn on" service to turn on said lamp, and a "turn off" service to turn off said lamp. A multimedia player is another object that could for example offer a "broadcast" service for multimedia content. Lastly, a telephone is an object that could propose a "call" service to establish a telephone connection.

In order to define the augmented object 3 and the services that it may offer, a virtual object 7 is associated with the physical object 6. This virtual object 7 is a computer world object. Therefore, it comprises purely data and/or program type software elements, and may also comprise physical, typically electronic, management, interface, or interconnection elements.

Said virtual object 7 may comprise at least one definition and/or identification element for the physical object 6. Therefore, an augmented object 3 is defined uniquely within a given environment. The virtual object 7 associated with a physical object 6 comprises at least one definition element, defining the service or services offered by said augmented object 3, via the physical object 6.

According to an essential characteristic of the invention, it is possible to connect to the augmented object via a first means of communication 10, for example a network. The connection and the communication interface with said means of communication 10 are carried out by the virtual object 7 of the augmented object 3. Therefore, a user 5 may connect to an augmented object 3, via a user terminal 12, in order to dialogue and exchange information.

The device 1 comprises a means of video capture 8 capable of taking a video image 9 of at least part of the environment. This means of video capture 8 is located in the object area 2. This means of video capture 8 may comprise at least one video camera, for example a webcam.

A second means of communication 11, makes it possible to transmit said captured video image 9 from the object area 2 to the user area 4.

The user 5 dialogues with the device 1 and commands it using a user terminal 12. The user terminal 12 is located in the user area 4 and is capable of displaying said video image 9 captured and transmitted for presentation to the user 5. Therefore, the user 5 may advantageously, remotely, be visually informed in real time of what is happening in the object area 2.

The device 1 also comprises an automatic means of identifying 13 an augmented object 3 when the physical object 6 associated with this augmented object 3 is present in the field of the means of video capture 8. Said means of identification 13 may function according to various principles, including some that will be described by way of illustration. The identification may be carried out at any time, by request, or continuously. However, an object 3 must be identifiable, at least when it is visible to the means of video capture 8 and present in the video image 9 presented to the user 5. As will be described later, the identification process makes it possible to recognize the object 3 and to uniquely identify it. This identification therefore provides a means of locating said object 3 in order to connect to it. Thus, in the case of a communication network, the identification provides a unique network address for said augmented object 3, making it possible to locate the object on the network and connect to it.

The device 1 also comprises a first means of communication 10. The first means of communication 10 makes it possible to establish a connection between the device 1 and the augmented object 3 thus identified, based on the identification element or elements provided by the means of identification 13. The connection established with the augmented object 3 makes it possible to query the augmented object 3 to recover information about the augmented object 3 contained in a means of storage associated with said object 3 or referenced by said object 3.

From the information thus recovered, the device 1 distinguishes at least the definition elements for one or more services offered by said augmented object 3.

Therefore, to return to the lamp example, the device connects to the augmented lamp identified and recovers two services, "turn on" and "turn off", as well as the definition elements for these services. Therefore, in the present case the definition elements for the "turn on" service comprise for example its name: "turn on", its type: binary command, as well as the elements necessary for its implementation: address of the physical connection to be activated to carry out the service to turn on the lamp.

It goes without saying that if several augmented objects 3 can be identified in a video image 9, several connections are established, sequentially or in parallel, between the device 1 and each of the various augmented objects 3, in order to recover information about each one.

The device 1 also comprises a means of defining a control interface 14, which, based on the service definition elements for an augmented object 3, may define a control interface 15 for the services of the identified augmented object 3. This control interface 15 presents a front panel, for example graphical, that can be displayed on the user terminal 12 in order to be perceived by the user 5. In relation to this front panel, the control interface 15 comprises the connections necessary to transmit the service commands to the augmented object 3. The control interface 15 is defined according to the service definition elements.

The device 1 also comprises a reader 16 capable of reading the commands applied by the user 5. This reader 16 is configured according to the service definition elements extracted from the identified augmented object 3 and in relation to the front panel of said control interface 15.

Thus, to return to the lamp example, the two services, "turn on" and "turn off", will, for example, be shown on a control interface 15 comprising 2 buttons. These two buttons will be shown graphically, each recognisable by its name. The reader 16 is then capable of detecting activation by the user 5 of one or the other of the two buttons. If the user operates the button associated with the "turn on" service, the reader 16 will read a corresponding "turn on" service command.

The device also comprises a third means of communication 17. This means of communication is in charge of transmitting a command read by the reader 16 to the augmented object 3.

This transmission is carried out so that the augmented object receives said command and executes the corresponding service on the physical object 6.

Thus, to continue with the lamp example, a "turn on" command is read. It is transmitted to the augmented lamp object, which then activates the necessary interface elements so that the service is executed and the physical lamp turns on.

The perception of the environment presented to the user 5 is advantageously visual through the video image 9. It may however be replaced or supplemented by feedback involving other sensory means. Thus, the device 1 may advantageously comprise a means of sound capture, in the object area 3, more or less geographically close to the means of video capture 8 in order to capture sound from the environment. A fourth means of transmission is then used to transmit said sound from the object area 2 to the user area 4, in order to play said sound using a means of sound production, such as headphones or speakers, contained in the user terminal 12, to the user 5.

It is also possible to add other feedback based on the same principle, such as touch feedback. All these perceptual aids work together to inform the user 5 about the environment and what is happening there, particularly in response to the user's actions 5 controlling the services of the augmented objects 3 and thus modifying said environment.

Advantageously, in order to vary the field perceived by the means of video capture 8 and thus to increase the scope of the environment that can be perceived by the remote user 5, the means of video capture 8 can be controlled. Therefore the attitude of the video capture device may be controlled, for example in terms of elevation and bearing. A video capture device may also have a zoom control. A video capture device may also have a position control. The latter possibility may be carried out using a mobile base, such as a controllable robot, with a video capture device mounted on said mobile base. This may also be carried out with several video capture devices coupled to a control room type means of selecting sources. It is also possible to combine these various embodiments. The user terminal 12 then comprises a means of control 18 adapted to the structure of the means of video capture 8, capable of enabling the user 5 to carry out said control and producing control commands. The device 1 advantageously comprises a fifth means of communication 19 capable of transmitting said control commands from the user area 4 to the object area 2, for execution by the control body or bodies carrying out the attitude, position, selection commands on the means of video capture 8.

One important part of the device 1 is the identification of the augmented object 3. Several techniques can be applied equally to obtain such an identification. Identification is necessary in that it makes it possible to uniquely designate the augmented object 3 in order to connect to said augmented object 3.

A first embodiment of a means of identification may use shape recognition according to any known method, by analysis of the video image 9. However, such an analysis enables recognition and not identification. Shape analysis thus makes it possible to recognize that an object is a lamp, but identification requires knowing precisely which lamp it is.

A shape recognition method must therefore be supplemented by other means. It is therefore possible to proceed by using a pre-established inventory. The lamp may thus be identified with certainty if there is only one lamp (or one lamp of this type/colour, or in this environment/room).

Another embodiment of a means of identification 13 may use the location of the physical object 6, alone or in combination with another means such as shape recognition. Thus the object is identified by its location. The object is a lamp because it is in the left corner of the room. Or again in combination, the lamp recognized by its shape is lamp no. 3 because it is (the only lamp) located one meter above the floor. Such an approach requires, however, advance definition, for example in the form of mapping, of the positions of various objects, which reduces the generic nature of the device. Another disadvantage is that it becomes difficult or impossible to identify an augmented object 3 if it has been moved.

Determining the position of an object may be carried out based on the position and attitude of the means of video capture 8. Therefore, as the position of the video capture device is known, because it is fixed or by any known means of location, such as a GPS receiver, if it is variable, the position of an object may be determined by knowing the angle of attitude of said video capture device. Properly speaking, such identification indicates a line and not a position. However, such identification may suffice to identify an object 3, if no other object (or object of the same type, or of the same shape, etc.) is present on said line.

However, an embodiment of a means of identification 13 not requiring any advance mapping preparation and tolerating the potential and always possible movement of the object 3 is preferable. Such a means of identification 13 can be carried out by equipping the physical object 6 associated with an augmented object 3 that one wants to identify with an identifying marker 20. Such a marker 20 is unique so as to be identifying. It is positioned on or near the physical object 6. It is placed so that it can be seen/read depending upon its type. Its characteristic signature (shape, colour, coding, etc.) is saved in a look-up table, accessible from the device 1, associating a signature with a unique augmented object identifier (for example the network address of said augmented object 3). An alternative approach consists of coding the identification elements of the augmented object 3 enabling connection directly into the identifying marker 20.

According to this embodiment, advance preparation of the environment is also necessary here. However, here, the preparation is carried out only once, for each augmented object 3, individually and independently. It is conceivable, that all the candidate objects will be configured in this way in the factory in the future, associating them with a unique visible/legible identifying marker 20 and a network connection address, for example, the current MAC address. It the correspondence between the identifying marker 20 and the connection identification elements is not coded directly into the identifying marker itself, the look-up table may be published by the manufacturer of the object, for example on the Internet, so as to be accessible.

The identifying marker 20 may be a visual marker (pictogram, bar code, colour code, etc.) visible advantageously by the means of video capture 8, so as to be recognized by the device 1, for example by image analysis. A visual "coding", such as a bar code, advantageously makes it possible to directly include the network connection identifier into its code, or else an address or any other means of reference making it possible to find it.

Advantageously, such a visual marker does not require any additional means of reading, as it reuses the means of video capture 8. One disadvantage of such a visual marker is that it is only visible in the limited area of the space around a privileged direction.

According to an alternative embodiment, the identifying marker is a radio frequency label, also known under the name RFID. In this case, the device 1 must also comprise a radio frequency label reader. The reader, located in the object area 2 is capable of reading such a radio frequency label. Such a radio frequency label is "coding" with the previously mentioned advantage. Advantageously, such a radio frequency label does not need to be seen to be able to be read and may be hidden/embedded in the object 3. Also advantageously, reading such a radio frequency label may be carried out indifferently in any spatial direction.

It has been described that the means of defining the interface 14 extracts, from the augmented object 3, the definition elements of the control interface 15 associated with the services offered by said augmented object 3. The control interface is at least defined by type by the object 3. Therefore, in the lamp example, the definition elements for the control interface 15 comprise at least the indication that each of the two services, "turn on" and "turn off", are associated with a binary command. The object may 1150 comprise more specific indications, such as the layout, appearance, or even the detailed graphical representation of a control interface 15 proposed by the augmented object 3.

According to a first embodiment, the means of defining the interface 14 directly and fully uses the control interface proposed by the augmented object 3. This makes it possible to comply with a graphical aesthetic unique to the augmented object 3.

Alternatively, the means of defining the interface 14 uses type definition elements to construct a control interface 15 compatible with the object 3 and its services, but defines a graphical appearance without considering the one proposed by the augmented object 3. This makes it possible for the means of defining the interface 14 to propose a control interface 15 with a homogeneous graphical aesthetic from one augmented object 3 to another.

This ability to automatically extract the interface type definition elements and all or part of their graphical representation, from the augmented object 3 identified in a video image 9 without any prior knowledge of the environment or the objects is highly advantageous in that it enables the implementation of the device 1 without advance definition, environmental modelling, or configuration.

Moreover, automatic and autonomous identification (without configuration or preparation) makes it possible to understand an unknown environment and tolerate changes to said environment, for example by moving the objects 3.

It is clear that the elements extracted after connection to the augmented object 3 may be extracted from a means of storage contained in the augmented object 3 itself. Alternatively, a reference or address may be extracted from the object 3 indicating a remote means of storage where these elements are stored.

After having defined said control interface 15, the means of definition 14 is capable of displaying it on a means of display advantageously contained in the user terminal 12.

According to a particularly advantageous embodiment, the display of said control interface 15 is carried out, by a graphical overlay directly on the video image 9. Therefore, on a single means of display, the user 5 has all the information necessary for interacting with an object 3 in order to use its services. The control interface is therefore advantageously located near the augmented object 3 to which it is associated. The user 5 may thus control the services of the object 3 using said control interface 15, and on the same display observe the consequences of using a service.

Thus, still with the lamp example, a graphical representation of the control interface is superimposed on a video image in which the lamp appears, near the lamp so that the association is clear, showing the "turn on" and "turn off" buttons. When the user 4 commands one of these two services, he or she may directly observe the consequence on the environment through the video image 9. Therefore, after commanding the "turn on" service, the lamp is turned on, and the user 5 may observe the effect of lighting in the environment.

Together with said control interface 15 presented to the user 5, the device 1 comprises a means of reading 16 the commands carried out by the user 5. This reader 16 may comprise a keyboard, a touch pad, and/or a pointing device. This element or these elements are configured in relation to the control interface 15. Thus, in the lamp example, a keyboard may be used by associating a key with each of the two services, "turn on" and "turn off". Pressing the associated key commands said service. A touch pad may also be used. Advantageously, it is overlaid onto the means of display upon which the graphical representation of the control interface 15 is displayed. Also traditionally, a mouse (or joystick, trackball, pad, etc.) pointing device may be used. In this case, a graphical button is activated by clicking on its active zone.

It must be possible to establish a connection with an augmented object 3, as defined in relation to the present invention. A first means of communication is therefore used to access information from the object and to define its control interface.

A third means of communication 17 is also used to transmit a command for a service from the user terminal 12 that read said command from the user 5 to the augmented object 3, which executes said command to carry out the corresponding service.

This third means of communication 17 systematically comprises a first link between the user terminal 12 and the augmented object 3. This connection, most often through a network, establishes a link between the user terminal 12 and the virtual object 7. It may also comprise a second connection. The second connection is a special connection interface between the virtual object 7 and the physical object 6. Thus, in the case of the lamp, which is, before augmentation, a purely physical object, it is necessary to supplement it with a special connection interface physically associating the two virtual services, "turn on" and turn off", with a switch device.

In the case of an electronic or computer object, such as a network drive or a DVD player having an Internet interface, intrinsically comprising a network interface, these two connections overlap.

According to one advantageous embodiment, the first, second, third, fourth, and fifth means of communication overlap and comprise a communication network, for example, the Internet.

Therefore, to supplement and illustrate this description of the structure of the device 1, an example will now be presented to illustrate its usage, so as to show the potentialities of this new paradigm.

The application framework is a remote interaction in a home appliance environment, applied to entertainment and child monitoring, at home, by a parent (user 5) from his or her workplace, using a terminal 12.

The user 5 can view the interior of the home (object area 2) from his or her workplace (user area 4) using a webcam 8 whose image is retransmitted, via Internet, advantageously to a standard personal computer (user terminal 12). The video image 9 shows a living room. The device automatically detects and, where applicable, graphically highlights the presence of three augmented objects in this scene: a lamp, a telephone, and a multimedia player. The device selectively (for example when one moves a pointer over the object) makes it possible to display or hide a control interface 15 for each of the three augmented objects.

It is 5:00 pm and the parent can observe, via the video, his or her child who has returned home.

The parent selects the telephone object. This displays a control interface offering at least a "call me" service. This service is commanded and triggers the establishment of a telephone call to the telephone present in the home, and which connects the parent, via the terminal, and the child via said telephone.

During the conversation that follows, the parent proposes that the child watch the latest video clip from their favourite group, which the parent has just downloaded.

The parent selects the multimedia player. This displays a control interface offering at least a "broadcast" service. The parent selects the video clip on the desktop of his or her terminal and drags it onto the control interface for the "broadcast" service. This triggers the downloading of said clip from the workplace to the multimedia player at home and then plays said clip on said multimedia player for the child's viewing.

So as not to disrupt the broadcast of the clip, the parent can select the lamp object, to turn it off, all carried out remotely.

The invention claimed is:

1. A device enabling a user, located in a user area, to interact with at least one augmented object present in an environment, said augmented object being located in an object area, the augmented object comprising a physical object and an associated virtual object, said virtual object comprising at least one service definition element for at least one service offered by said augmented object, said augmented object being able to be connected via a first means of communication and said device comprises:
   A video camera, located in the object area, taking a video image, of at least one part of said environment,
   one or more processors configured to transmit said video image of the object area to the user area,
   A user terminal located in the user area, displaying said video image, in order to present to the user,
   wherein the one or more processors is further configured to:
   automatically identify the augmented object when the associated physical object is present in a field of view of the video camera,
   establish a connection between the device and the identified augmented object, and to recover one or more service definition elements of services offered by said augmented object,
   define a control interface for the services of the identified augmented object according to said one or more service definition elements, and to present said control interface of the identified augmented object to the user, through the user terminal,
   receive, via the control interface presented on the user terminal, user commands for said services, in relation to said control interface, and
   transmit said user commands to the augmented object, so that the physical object can execute said services.

2. A device according to claim 1, comprising a microphone, located in the object area, capable of capturing sound from the environment, wherein the one or more processors is further configured to transmit said sound from the object area to the user area, where the sound is played back by the user terminal for the user.

3. A device according to claim 1, where an attitude and/or position of the video camera can be controlled, where the user terminal also comprises a video command interface, capable of enabling the user to carry out said control by producing control commands, and wherein the one or more processors is further configured to transmit said control commands from the user area to the object area.

4. A device according to claim 1, where the one or more processors is configured to recognize a shape of the physical object (6) when automatically identifying the augmented object.

5. A device according to claim 1, where the one or more processors is configured to locate the physical object when automatically identifying the augmented object.

6. A device according to claim 1, where the one or more processors is configured to identify an identifying marker located on or near the physical object when automatically identifying the augmented object.

7. A device according to claim 6, where the identifying marker is a visual marker.

8. A device according to claim 6, where the identifying marker is a radio frequency label, and where the device also comprises a radio frequency label reader located in the object area capable of reading such a radio frequency label.

9. A device according to claim 1, where the one or more processors defines the control interface using a control interface proposed directly by the augmented object.

10. A device according to claim 1, where the one or more processors defines the control interface by recovering a control interface defined according to the one or more service definition elements from a computer-readable storage medium.

11. A device according to claim 1, where the one or more processors defines the control interface by embedding the control interface in the video image displayed on the user terminal.

12. A device according to claim 1, where the user terminal, in relation with said control interface, comprises a keyboard, a touch pad, and/or a pointing mechanism.

13. A device according to claim 1, where the one or more processors generates a link between the user terminal and the augmented object and a special connection interface between the virtual object and the physical object.

14. A device according to claim 1, where the one or more processors is further configured to communicate over the Internet.

* * * * *